//

US009951593B2

(12) United States Patent
Hussein et al.

(10) Patent No.: US 9,951,593 B2
(45) Date of Patent: Apr. 24, 2018

(54) USE OF ORGANOCLAY AS EMULSIFIER IN POLYMERIC GELS FOR WATER PERMEABILITY REDUCTION

(71) Applicants: King Fahd University of Petroleum and Minerals, Dhahran (SA); King Abdulaziz City of Science and Technology, Riyadh (SA)

(72) Inventors: Ibnelwaleed Ali Hussein, Dhahran (SA); Ahmad Akanbi Adewunmi, Thuqba (SA); Abdullah Saad Sultan, Dhahran (SA); Khalid Saad Elkarsani, Dhahran (SA); Ghaithan A. Al-Muntasheri, Houston, TX (US)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 905 days.

(21) Appl. No.: 14/258,486

(22) Filed: Apr. 22, 2014

(65) Prior Publication Data

US 2015/0299557 A1    Oct. 22, 2015

(51) Int. Cl.
*E21B 43/16* (2006.01)
*C09K 8/506* (2006.01)
*C09K 8/512* (2006.01)
*C09K 8/516* (2006.01)

(52) U.S. Cl.
CPC ............. *E21B 43/16* (2013.01); *C09K 8/506* (2013.01); *C09K 8/512* (2013.01); *C09K 8/516* (2013.01)

(58) Field of Classification Search
CPC ........ C09K 8/506; C09K 8/512; C09K 8/516; E21B 43/16

USPC ............... 507/225, 240; 166/305.1
See application file for complete search history.

(56) References Cited

U.S. PATENT DOCUMENTS

| 4,382,868 | A  | * | 5/1983  | House ............. C01B 33/44 508/143 |
| 4,687,516 | A  |   | 8/1987  | Burkhalter et al. |
| 5,837,654 | A  | * | 11/1998 | Carroll ............. C09K 8/32 507/100 |
| 5,979,557 | A  | * | 11/1999 | Card ............... C09K 8/68 166/281 |
| 6,150,425 | A  |   | 11/2000 | Sekine et al. |
| 7,749,945 | B2 |   | 7/2010  | Xiang |
| 7,928,154 | B2 |   | 4/2011  | Chan et al. |
| 8,158,243 | B2 |   | 4/2012  | Chan et al. |
| 8,985,212 | B1 | * | 3/2015  | Crespo ............. E21B 43/025 166/270 |
| 2008/0009424 | A1 | * | 1/2008 | Stavland ............ C09K 8/502 507/225 |
| 2014/0106992 | A1 | * | 4/2014 | Patil ............... C09K 8/36 507/214 |

* cited by examiner

*Primary Examiner* — Frances Tischler
(74) *Attorney, Agent, or Firm* — Oblon, McClelland, Maier & Neustadt, L.L.P.

(57) ABSTRACT

Organoclay is used as an alternative emulsifier and reinforcing agent to enhance the strength of emulsified polymeric gel aqueous solutions and form water in oil emulsions. The stability of the emulsion can be controlled by controlling salinity and the intensity of initial mixing. The new system can be used for water shut-off treatments as well as a relative permeability modifier in high water permeability zones. In addition, the system can tolerate salts much better than classical surfactants. This system will be appropriate for wellbores having high temperature (>85° C.) with harsh environmental conditions.

10 Claims, 10 Drawing Sheets

USE OF ORGANOCLAY AS EMULSIFIER IN POLYMERIC GELS FOR WATER PERMEABILITY REDUCTION

BACKGROUND OF THE INVENTION

Technical Field

The present invention relates to an organoclay comprising Ditallow-dimethyl-ammonium salt and a phyllosilicate, an emulsified gel using the organoclay and a polyethyleneimine cross-linked polyacrylamide chain, and a method for using the emulsified gel.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Stavland et.al (2006) (Arne Stavland, Knut Inge Andersen, Bernt Sandoey, Tore Tjomsland, Amare Ambaye Mebratu: "How to apply a blocking gel system for bullhead selective water shutoff: From Laboratory to field", SPE 2006) (incorporated herein by reference in its entirety) proposed a new mechanism for water control in oil fields liable to high water production during oil exploration. This new mechanism involved injecting water-based emulsified gelant into the formation. In their investigation, emulsion was designed such that it separated into a water phase and oil phase at static conditions in the formation. Following the reaction in the formation, it was expected that the water phase gels up while the oil phase remains mobile.

Cross-linked polymeric gels especially polyacrylamide gels are widely used in petroleum industries to minimize water production during oil and gas exploration and production. Aqueous polymer gels are usually emulsified in oil and then injected in the water zones. The purpose of the emulsification is to provide open pathways for oil flow. This is because in water wet media, the gel formed will block pore throats and reduce the permeability to water and oil. Therefore, oil should form the external phase of the emulsion. The emulsion should be injected as one component, and then it will separate into oil phase (for oil flow) and water phase. The water phase contains the gelant which will gel up in a portion of the pore space to reduce permeability to water. Surfactants are usually used to emulsify the aqueous gel solution in oil.

Gelled or cross-linked water soluble polymers are widely used in many petroleum industries to reduce water production from high permeability zones in wellbores and increase oil production. For instance, such gelled polymers can be utilized to change the permeability of underground formations. In several water shut-off applications, polymers and suitable crosslinking agents or systems are pumped in an aqueous solution into the underground formation. The polymers permeate into regions having the highest water permeability and gel therein.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

One embodiment of the disclosure relates to an organoclay comprising Ditallow-dimethyl-ammonium salt and a phyllosilicate.

In another embodiment, the ammonium salt in the organoclay is ammonium chloride and the phyllosilicate in the organoclay is sodium bentonite.

In another embodiment, the organoclay has a density of 1.6-1.8 kg/m$^3$.

In another embodiment, an emulsified gel comprises the organoclay, a polyethyleneimine cross-linked polyacrylamide chain, an oil, and water.

In another embodiment, the emulsified gel further comprises the polyethyleneimine cross-linked polyacrylamide chain with 3-10% wt polyacrylamide and 0.3-1.2% wt polyethyleneimine.

In another embodiment, the polyethyleneimine cross-linked polyacrylamide chain and oil have a volume ratio of 60-80% polyethyleneimine cross-linked polyacrylamide chain and 40-20% oil.

In another embodiment, a method for using the emulsified gel comprises preparing an emulsified gel solution comprising polyethyleneimine cross-linked polyacrylamide chain, water and diesel injecting the gel into a well to modify the permeability of a porous formation surrounding the well.

In another embodiment the wellbore has a temperature greater than 85° C.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
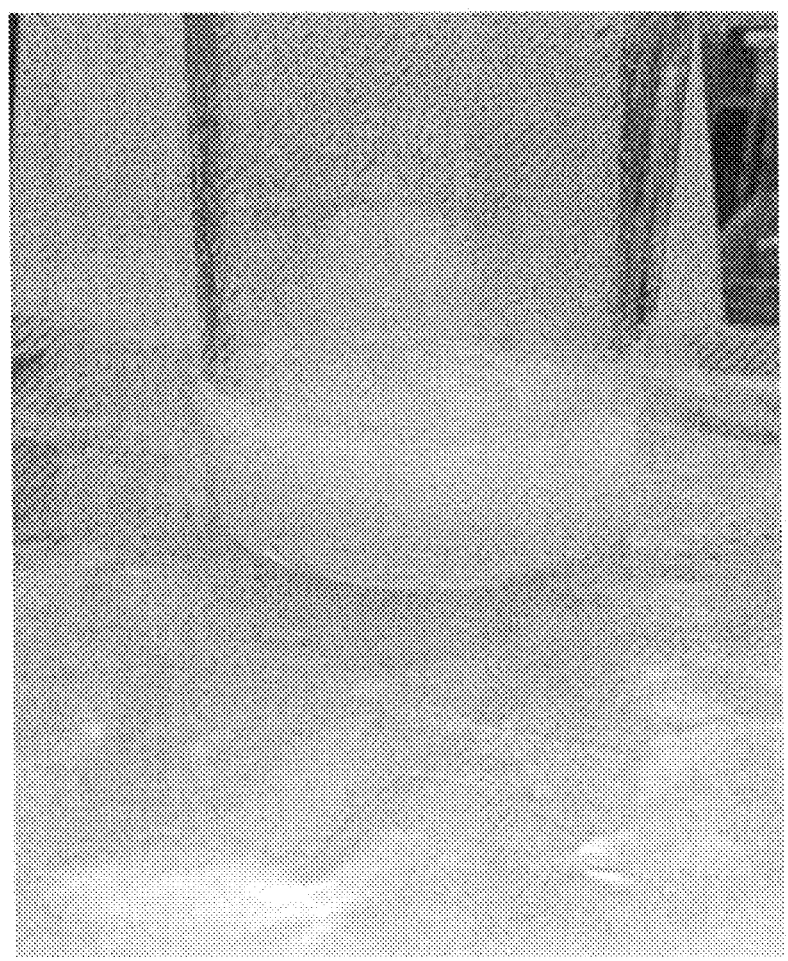
FIG. 1 depicts an example of water-in-oil emulsion.

Referring now to the drawings, wherein like reference numerals designate identical or corresponding parts throughout the several views.

One embodiment of the invention includes a method of making an emulsified gel solution. A water in oil emulsion is prepared by dissolving a surfactant into a diesel solution to create a mixture. The surfactant, also known as an emulsifier, is preferably an oil soluble salt. More preferably, the surfactant is a tallowamine acetate salt.

In another embodiment, Polyacrylamide (PAM) and polyethyleneimine (PEI) are used as emulsifying agents. PEI is used as the cross-linking agent to form a PAM/PEI cross-linked chain.

Cross-links are formed by chemical reactions that are initiated by heat, pressure, change in pH or radiation. In one embodiment, mixing of an unpolymerized or partially polymerized resin with cross-linking reagents results in a chemical reaction that forms cross-links. Cross-linking can also be induced in materials that are normally thermoplastic through exposure to a radiation source, such as electron beam exposure, gamma-radiation, or UV light. For example, electron beam processing is used to cross-link the C type of cross-linked polyethylene. Other types of cross-linked polyethylene are made by addition of peroxide during extruding (type A) or by addition of a cross-linking agent (e.g. vinylsilane) and a catalyst during extruding and then performing a post-extrusion curing.

In one embodiment of the invention, the cross-linking of PAM and PEI occurs as a mixture is injected into a well. The mixture that is injected into the well comprises PEI, PAM and organoclay. The PAM is cross-linked with PEI as both polymers are injected into the well.

In another embodiment, PAM and PEI are cross-linked to form a cross-linked PAM/PEI polymer solution prior to injection into the well. The water in oil emulsion is then mixed with the cross-linked PAM/PEI solution and is then subjected to agitation to create a homogenous mixture of the compounds. Manual methods and mechanical methods may be used to mix the solution. Manual methods of mixing may be used to mix the solution including but not limited to swirling the solution by hand and by placing a magnetic stir bar in the solution and stirring with a magnetic stir plate. Mechanical methods include but are not limited to sonicating the solution using an ultrasonic bath or an ultrasonic probe, ultrasonicating the solution, or using a high power homogenizer. Preferably, a high power homogenizer is used to agitate the mixture. The mixture is mixed in the homogenizer at a power in the range of 30-100 Hz, 40-80 Hz, or 50-60 Hz. Preferably, the mixture is mixed in the homogenizer at a power in the range of 50-60 Hz. The homogenizer functions at a power within the range of 800-1500 W, 900-1300 W, or 1000-1200 W. More preferably, the homogenizer functions at a power between 1000-1200 W. The speed of agitation in the homogenizer is in the range of 2000-5000 rpm, 2500-4500 rpm, or 3000-4250 rpm. Preferably, the speed of agitation is 4000 rpm. The solution is homogenized at a time period ranging from 10-50 minutes, 15-40 minutes, and 20-30 minutes. Preferably, the solution is homogenized continuously for 30 minutes.

Following mixing of the surfactant and diesel solution, brine solution is added gradually to the mixture. The brine solution is added at a volume in the range of 5-30 kppm NaCl, 10-25 kppm NaCl, or 15-20 kppm NaCl. Preferably, the brine solution is added at a volume of 20 kppm NaCl.

The concentration of PAM in the emulsified aqueous gel solution is 3-15% wt, 4-12% wt, or 4-10% wt. Preferably, the concentration of PAM in the emulsified aqueous gel solution is 7% wt. The concentration of PEI in the emulsified aqueous gel solution is 0.001-2% wt, 0.01-1.5% wt, or 0.02-1.0% wt. Preferably, the concentration of PEI in the emulsified aqueous gel solution is 0.3% wt.

The diesel to gel solution formation ratio may range from 10% diesel and 90% gel solution, 20% diesel and 80% gel solution, 30% diesel and 70% gel solution, and 50% diesel and 50% gel solution. Preferably, the diesel to gel solution formation ratio is 30% diesel and 70% gel solution.

In another embodiment, two emulsified gel solutions are prepared using distilled water. The first emulsified gel solution includes the surfactant with a total sample volume in the range of 0.1-5%, 0.2-4%, or 0.3-3%. Preferably, the emulsified gel solution includes the surfactant with a total sample volume of 0.5%.

The second emulsified gel solution includes an organoclay that is used in place of the surfactant. The organoclay is a ditallow-dimethyl-ammonium salt mixed with a phyllosilicate. The salt may include but is not limited to ammonium chloride, ammonium carbonate, and ammonium nitrate. Preferably, the ammonium salt is ammonium chloride. Phyllosilicates include but are not limited to antigorite, chrysotile, lizardite, halloysite, kaolinite, illite, montmorillonite, vermiculite, talc, palygorskite, pyrophyllite, biotite, muscovite, phlogopite, lepidolite, margarite, glauconite, chlorite, sodium bentonite, calcium bentonite, and potassium bentonite. Preferably, the phyllosilicate used is sodium bentonite. More preferably, the organoclay is a ditallow-dimethyl-ammonium chloride mixed with sodium bentonite.

The second emulsified gel solution includes the organoclay with a concentration in the range of 300-1000 ppm, 400-800 ppm, or 450-750 ppm. Preferably, the second emulsified gel solution includes the organoclay with a concentration in the range of 500 ppm. The droplet size distribution of the emulsified gel including about 500 ppm with an agitation speed of about 1000 rpm is in the range of 10-20 µm. More preferably, the droplet size is about 18 µm.

The present disclosure relates to the significance of organoclay as an alternative emulsifier and reinforcement agent. The organoclay based emulsifier enhances the strength of emulsified polymeric gel aqueous solutions and forms water in oil emulsions. The stability of the emulsion may be controlled by controlling the salinity and the intensity of initial mixing. The system demonstrates promising gel strength and may be used for water shut-off polymeric gels as well as a relative permeability modifier in high water permeability zones. In addition, the system can tolerate salts much better than classical surfactants. This gel will be appropriate for wellbores having high temperature (>85° C.) with harsh environmental conditions.

However, there are situations during oil recovery where selective water shut-off is desirable and not total water shut-off. In this type of scenario, emulsified gel systems having considerable strength will be more efficient and effective. Hence, the emulsified gel of the current disclosure is appropriate for selective water blockage in regions having high permeability. Water based gellant is emulsified in oil and then injected into the formation. The emulsion is formulated and designed to separate into a water phase and oil phase at static conditions in the formation. Following the reaction in the formation, it is expected that the water phase gels up while the oil phase remains mobile. The controlling parameter for disproportionate permeability reduction (DPR) is the control of the fraction of gel occupying the porous media. The water fraction in the emulsion controls the reduction in relative oil and water permeability.

One reliable method to achieving water cut in the high permeability zones is to use emulsified gel aqueous solution in oil with substantial gel strength. The disclosure describes an emulsified gel prepared by mixing polyacrylamide gel solution/oil (diesel) in the volume ratio of 70/30 containing suitable amount of surfactant (emulsifier). Another type of emulsified gel involves agitation of polyacrylamide gel solution/oil (diesel) in the volume ratio of 70/30 containing organoclay of appropriate quantity. The purpose of using organoclay is to replace or act as a substitute for classical surfactants used in such applications such as AKzoNobel Armac T. The new emulsifier enhances the properties of emulsified gel solutions and improves the gel strength. Distilled water and seawater are employed for the preparation of all emulsified gels in the current disclosure.

Currently, many nanomaterials are developed for several applications in various fields of endeavors. Layered silicate clay minerals are one of the most well-known nanomaterials due to their availability, low cost and more importantly environmentally friendly. The choice of organoclay in the embodiment of this disclosure includes its availability and high surface area of the dispersed nano-sized particle. Hence, the embodiment of this disclosure highlights the use of organoclay as emulsifier for optimal emulsified gel system performance in water shut-off applications during oil and gas exploration and production.

The surfactant (also known as emulsifier, ARMAC T) is used as a reference for comparison. The criteria for the selection were (i) oil solubility (ii) easy to mix in oil (iii) controllable separation time and (iv) friendly to environment. This surfactant is primary tallowamine acetate salt and is usually used as well as other surfactants for water in oil emulsions used in acid stimulation jobs ((Nasr-El-Din et al., 2006; 2007; Liang Xu, 2013). The use of surfactants to emulsify a gelant for permeability reduction was also studied in a previous patent (Arne Stavland, Sandnes (NO), Svante Nilsson, Jarfalla (SE): "Emulsified gelant", US 2008/0009424A1). An oil soluble surfactant was used. In another publication, alchol-etoxylate and fatty acid amine were used for gelant emulsification (Arne Stavland, Knut Inge Andersen, Bernt Sandoey, Tore Tjomsland, Amare Ambaye Mebratu: "How to apply a blocking gel system for bullhead selective water shutoff: From Laboratory to field", SPE 2006). Both the physical and chemical properties of the surfactant chosen for this invention are given in Table 1. The use of this surfactant is not limited to the findings of this embodiment. It can also be used as a dispersing agent; adjuvant; mineral/pigment; dispersant and flocculating agent. Thus, its applications are not in any way limited to the findings of this disclosure.

The key factors in the selection of oil for this invention were availability, viscosity, safety and price. Diesel was selected because it satisfies all of these requirements. The diesel employed was obtained from a local gas station in Saudi Arabia. Furthermore, organoclay was chosen as a potential emulsifier because of its inherent properties. Its application as an emulsifier for emulsified gel system in water shut-off is the main focus of this disclosure. The physical properties of organoclay employed in this disclosure are shown in Table 2.

EXAMPLES

Water in oil emulsion was prepared by first dissolving the surfactant into diesel followed by subjecting the mixture to agitation for few minutes. Afterwards, a measured volume of 20 kppm NaCl brine solution was added gradually. The emulsification process was performed using a high power homogenizer (Ultra Turrax T 50 basic, WERKE IKA, Germany). The speed of agitation was 4000 rpm. The agitation was continuous for 30 minutes. The image of the prepared water-in-oil emulsion is shown in FIG. 1.

Table 1 is a table describing the chemical and physical properties of the surfactant. Table 2 is a table describing the physical properties of the organoclay. Table 1 and Table 2 are presented below.

TABLE 1

Chemical and physical properties of Surfactant (Trade name: ARMAC T)

| | |
|---|---|
| Solubility in water at 25° C. | Isopropanol ethanol, hexane (35° C.) |
| HLB value | 6.8 Davies Scale 0-40 |
| pH | 6-9 |
| Vapor pressure | <1 mmHg @20° C. |
| Pour point | 65° C. |
| Flash point | 150° C. |
| Melting point | 55° C. |
| Appearance | Solid at 25° C. |
| Equivalent mass | 324 |
| Specific gravity | 0.845 |

TABLE 2

Physical properties of organoclay (Trade name: Cloisite 15A)

| | |
|---|---|
| Product name | Ditallow-dimethyl-ammonium salts with Bentonite |
| Supplier | Southern Clay Products, Inc. |
| Description | Cream powder |
| Specific density | 1.6-1.8 |
| Solubility | Oil soluble |

Figure 2A:
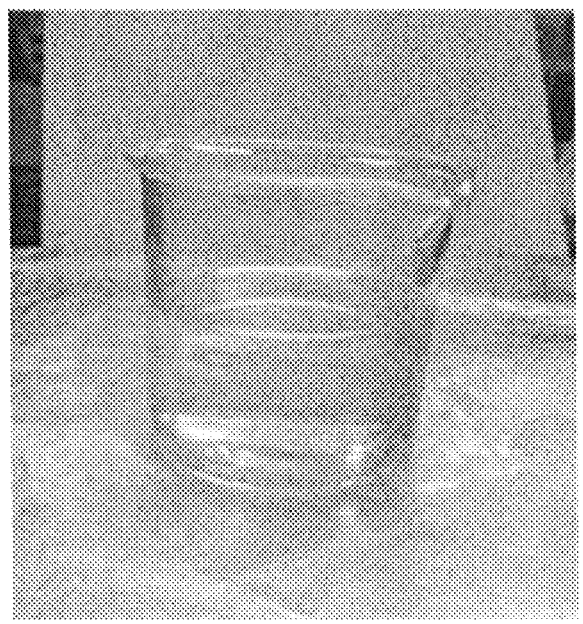
FIGS. 2A-2B depict an emulsion stability drop test.
Figure 2B:
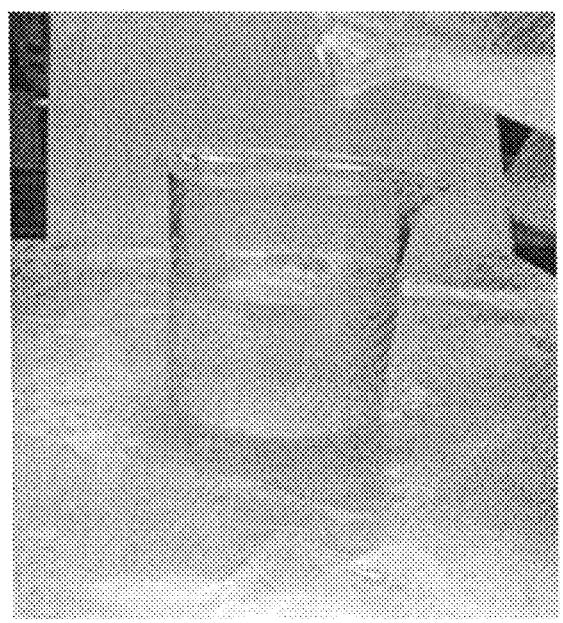

To ascertain that the produced emulsion was water-in-oil, the drop test was conducted. Oil (diesel) before addition of emulsion is shown in FIG. 2A while FIG. 2B confirms that the emulsion is water-in-oil since it did disperse in oil (diesel). In furtherance to ensure that the emulsion produced is water-in-oil-emulsion, a conductivity test is used to check the external phase of this emulsion. The result shows that the emulsion had 0µS/cm conductivity. This observation provided extra proof that the external phase is the non-conductive oil rather than the conductive brine solution.

Moreover, the embodiment of this disclosure also includes preparation of an emulsified gel aqueous solution. The preparation procedure involves the use of polyacrylamide (PAM) and polyethyleneimine (PEI) as cross-linker. The choice of choosing PAM and PEI is attributed to their blocking effect and the good thermal history. The developed gel solution includes PAM and PEI at concentrations of 7.0 wt % and 0.3 wt %, respectively. The diesel to gel solution formulation ratio is 30/70.

Two emulsified gels were prepared using distilled water. The first emulsified gel formulation contains surfactant (emulsifier) of 0.5% of total sample volume (0.125 ml) while the second emulsified gel formulation contained organoclay with a concentration of 500 ppm.

Figure 3A:
FIGS. 3A-3B depict produced emulsified gel solutions with organoclay and surfactant.

Another two sets of emulsified gels were again prepared using seawater. A set contains surfactant (emulsifier) of 0.5% of total sample volume (0.125 mL) while the other contains organoclay with a concentration of 500 ppm. All emulsified gel formulations used in this disclosure were obtained by mixing 7.0 wt % PAM and 0.3 wt % PEI in either distilled water or seawater for 10 minutes. Diesel of 30% by volume is mixed with the gel solution. Diesel was added to the gel to obtain the required gel/oil ratio. The mixture was then subjected to another 30 minutes of agitation after which emulsified gel solution was formed. The produced emulsified gel is displayed in FIGS. 3A-3B. FIG.

Figure 3B:

3A depicts the emulsified gel solution with the organoclay and FIG. 3B depicts the emulsified gel solution with the surfactant.

The produced emulsified gels were characterized by a TA hybrid rheometer equipped with pressure cell allowing measurements at higher temperature. The emulsified gels were pressurized with nitrogen gas in order to expel oxygen and to prevent the gel system from evaporation during rheological measurement. The operating pressure was 500 psi. Oscillatory measurements on the gel solution were performed at 120° C., a strain of 10% and a frequency of 1 Hz.

Figure 4:
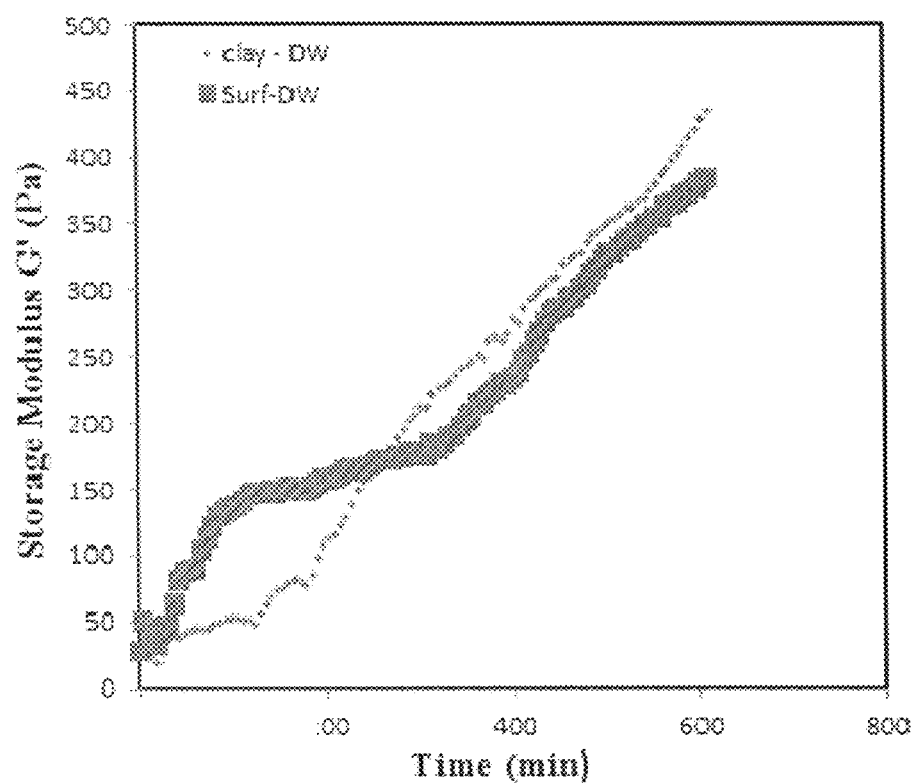
FIG. 4 is a graph of the storage modulus as a function of time of emulsified gels developed using distilled water.

Emulsified gels in distilled water (DW) are shown in FIG. 4. FIG. 4 is a graph of the storage modulus as a function of time of emulsified gels developed using distilled water. The use of surfactant in the emulsified gel produced a storage modulus of 380 Pa, whereas, using organoclay as an emulsifying agent resulted in a storage modulus of 428 Pa with an increase of 11% after~600 minutes. As such, organoclay can be utilized as an additive to reinforce the gel system for water shut-off in wellbores having high permeability zones.

Figure 5:
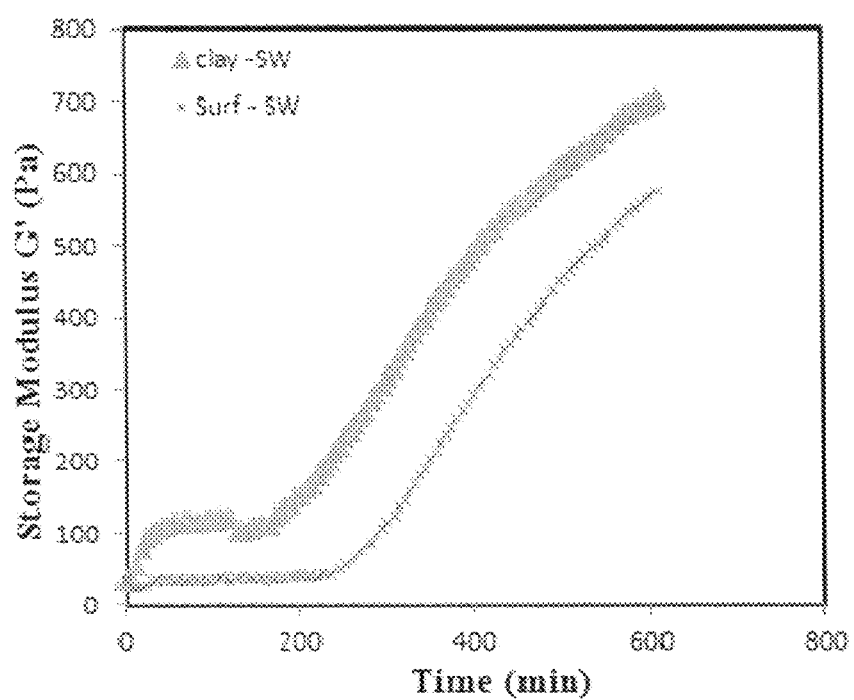
FIG. 5 is a graph of the storage modulus as a function of time of emulsified gels developed using seawater.
Figure 6A:
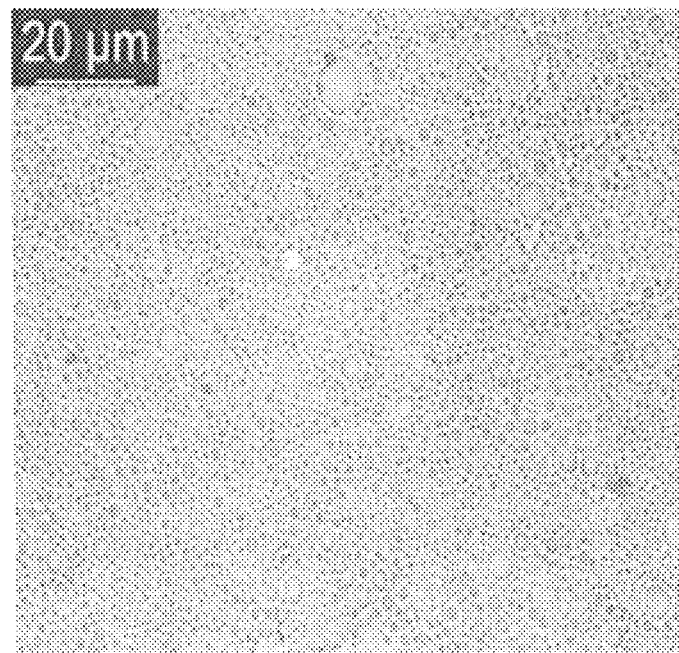
FIGS. 6A-6B depict the droplet size distributions of emulsified gel containing the surfactant and the organoclay at room temperature.
Figure 6B:
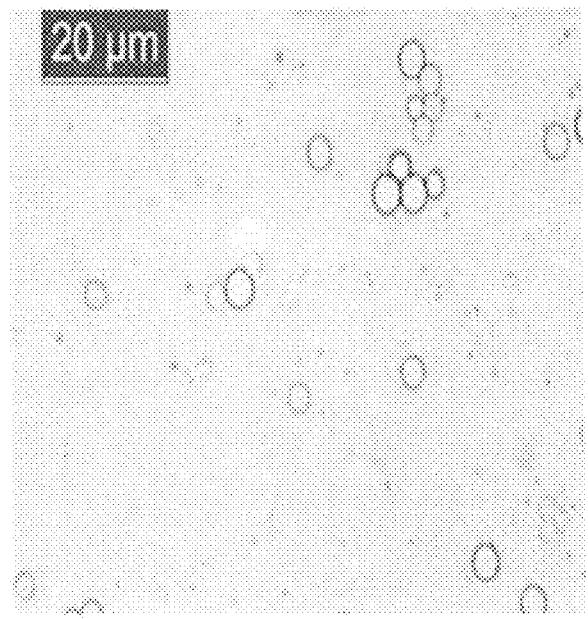

For comparison, seawater (SW) was also used to develop emulsified gels. FIG. 5 is a graph of the storage modulus as a function of time of emulsified gels developed using seawater. From FIG. 5, the emulsified gel containing surfactant achieved a storage modulus of 569 Pa while the emulsified gel system containing organoclay had a storage modulus of 703 Pa after~600 minutes. The emulsified gel system containing 500 ppm organoclay showed better performance in storage modulus. The emulsified gel developed using organoclay had higher storage modulus than emulsified gel containing surfactant. The difference in their strength was about 19%. It was very clear that emulsified gel prepared from seawater containing 500 ppm organoclay exhibited higher storage modulus. The droplet size of emulsified developed gels, as observed under the electron microscope, is shown in FIGS. 6A-6B. FIG. 6A is a micrograph of the emulsified gel containing the surfactant agitated at 400 rpm. FIG. 6B is a micrograph of the droplet size distribution of emulsified gel containing 500 rpm organoclay agitated at 4000 rpm. The addition of the organoclay resulted in very small droplet size which was likely the reason for the stability of the emulsion. The concept behind the technology of emulsified gelant for DPR is based on controlling the gelant saturation in the target zone. One method to achieve this task was to emulsify the gelant in oil or diesel. First, the gelant was prepared by adding the required amount of polymer and cross-linker to water. Then, oil or diesel was added to obtain the desired water to oil ratio. A quasi-sable emulsion was formed by adding a suitable emulsifier. After injection and well shut-in, the emulsion would separate into two phases. The oil phase maintains the flow for oil, while, the water phase containing the gelant gels up in some fractions of the pore and reduce permeability to water. There are important requirements for successful application of emulsified gelant. The injection and separation time should be lower than the gelation time.

Figure 7A:
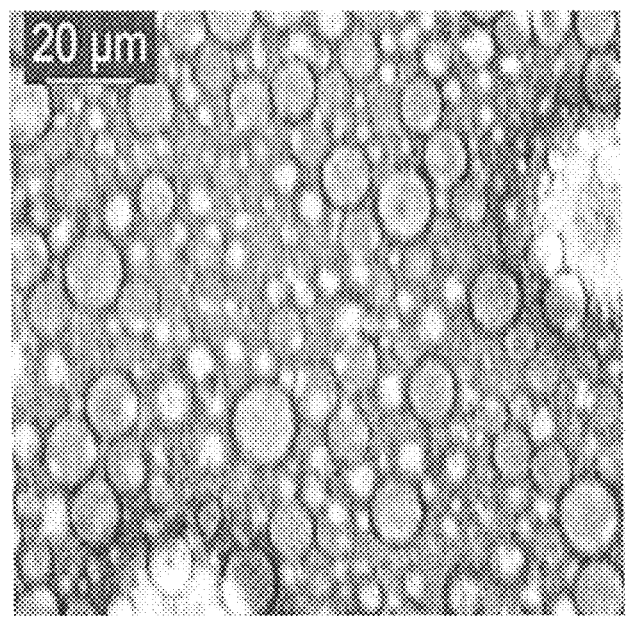
FIGS. 7A-7B depict the droplet size distributions of emulsified gel containing the surfactant and the organoclay at temperature of 50° C.
Figure 7B:
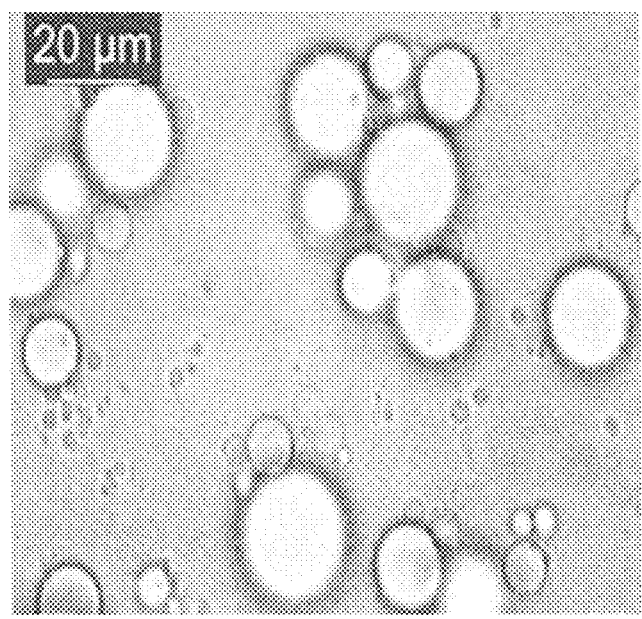
Figure 8:
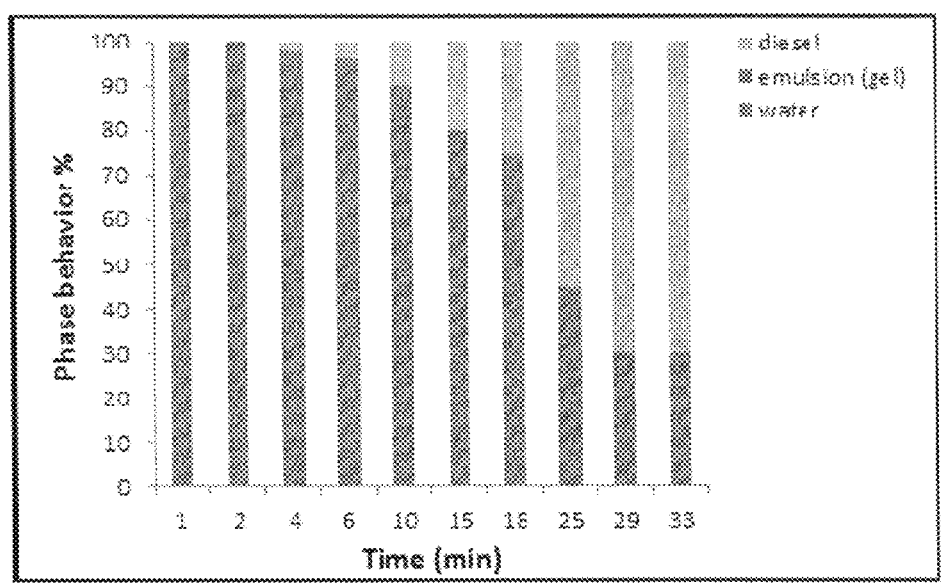
FIG. 8 is a graph of the phase behavior of the emulsified gel system containing the organoclay in seawater.

Thus, the phase separation behavior of emulsified gel containing 500 ppm organoclay in seawater was monitored. It should be pointed out that this particular emulsified gel system was agitated at a speed of 1000 rpm whereas all previously mentioned gel systems in this invention were agitated at 4000 rpm. The interesting observations here include: (i) application of organoclay as a substitute for emulsifier in preparing emulsified gel as the stability of produced emulsions using emulsifier tends to be weak, (ii) emulsified gel system produced using organoclay achieved good stability at room temperature and this means that this system will separate quickly at high temperature (>85° C.). To confirm that these emulsified gel systems will separate at higher temperature, droplet sizes of each separate emulsified gel containing surfactant and 500 ppm organoclay were viewed under electron microscope having heating device with flat glass surface. Each gel system was placed on the flat glass surface and heated up to 50° C. It was observed that the droplet sizes of these systems were larger than the droplet sizes shown in FIGS. 6A-6B. The large droplet size suggests reduced stability of these systems and consequently short separation time was observed with increased temperature. At this temperature (50° C.); the separation time of the gel system containing organoclay was shorter than the gel system containing surfactant. As a result, organoclay gel system with 500 ppm organoclay is expected to separate faster than surfactant gel system before gelation process begins. The droplet size images at 50° C. for both emulsified gel systems are given in FIGS. 7A-7B. FIG. 7A is a micrograph of the emulsified gel containing the surfactant at 50° C. and 1000 rpm. FIG. 7B is a micrograph of the droplet size distribution of the emulsified gel containing 500 ppm of the organoclay at 50° C. and 1000 rpm. The phase behavior versus time at room temperature for the two emulsified gel systems was displayed in FIG. 8. FIG. 8 is a graph of the phase behavior of the emulsified gel system containing 500 ppm organoclay in seawater conducted at room temperature and 1000 rpm. At room temperature, the water phase fully separated out within 25-33 minutes. The emulsified gel system was regained when subjected to agitation again at a speed of 1000 rpm. In spite of using 1000 rpm, the emulsified gel solution was stable as the droplet sizes were small. This observation suggested that organoclay could act as emulsifier in the formulation of the emulsified gel systems used in water permeability reduction.

Figure 9:
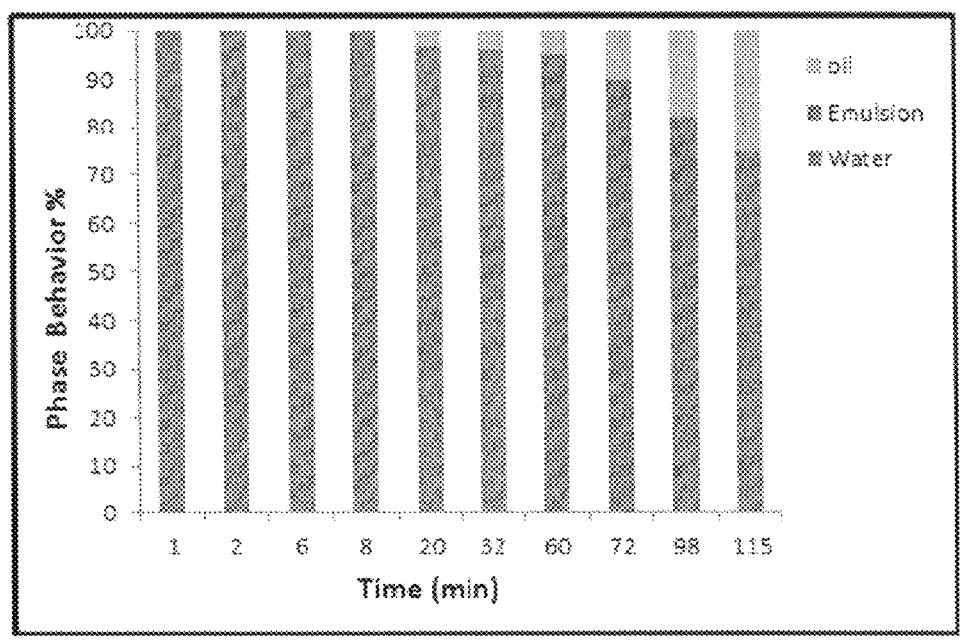
FIG. 9 is a graph of the phase behavior of the emulsified gel system containing organoclay in seawater.
Figure 10A:
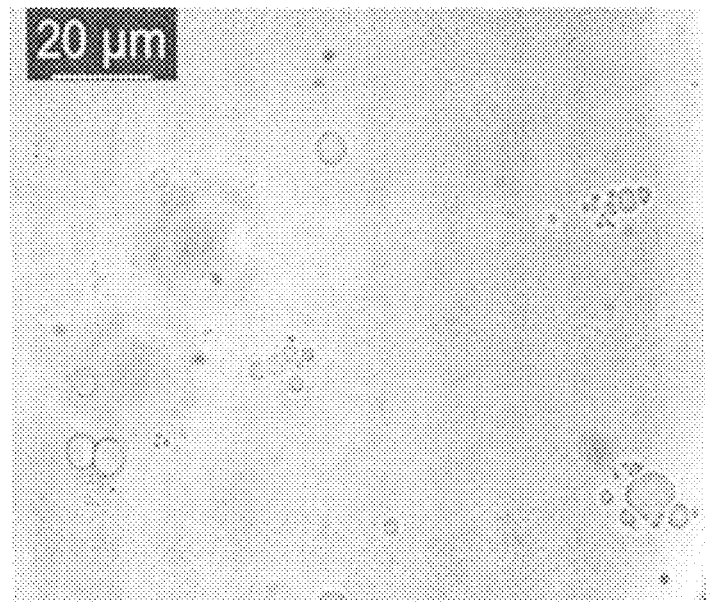
FIGS. 10A-10B depict the droplet size distributions of emulsified gel containing the organoclay at room temperature.
Figure 10B:
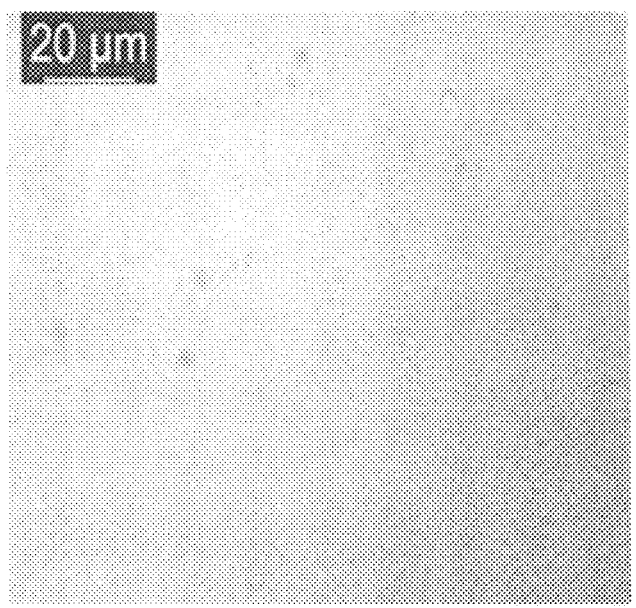

In the real field operation, the emulsified gel system is expected to separate before the beginning of the gelation process. So, the separation time should be less than the gelation time. However, the separation should not be too fast or spontaneous. Since the separation time of gel system containing 500 ppm organoclay lasted for just 33 minutes, it was decided to increase the concentration of organoclay to 1000 ppm and then study the phase behavior of this system once again. The water-oil phase fully separated after 115 minutes. It should be mentioned that the phase separation was conducted at room temperature and 1000 rpm. The phase behavior versus time of the emulsified gel systems containing 1000 ppm organoclay is shown in FIG. 9. FIG. 9 is a graph of the phase behavior of the emulsified gel system containing 1000 ppm organoclay in seawater conducted at room temperature and 1000 rpm. The droplet size of the emulsified gel solution containing 500 ppm and 1000 ppm organoclay are displayed in FIGS. 10A-10B. FIG. 10A is a micrograph of the emulsified gel containing 500 ppm organoclay viewed at room temperature and 1000 rpm. FIG. 10B is a micrograph of the droplet size of the emulsified gel containing 1000 ppm organoclay viewed at room temperature and 1000 rpm. The gel system containing 1000 ppm organoclay produced droplets that were very small which explained the observed long separation time. Therefore, the addition of the organoclay may be used to improve the gel strength as well as control the separation time at a specific reservoir temperature.

The embodiment of this disclosure highlights the significance of organoclay as emulsifier for water shut-off treatment in petroleum industries. This disclosure may be useful in petroleum and oil service companies. The emulsified gels developed may be suitable for the selective water shut-off in wellbores having high permeability and the emulsion stability can be controlled by using the dose of the organoclay or by controlling the intensity of the initial mixing.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method for modifying permeability of a porous formation surrounding a wellbore comprising:
    forming an aqueous gel solution comprising a polyacrylamide and a polyethyleneimine crosslinker,
    dissolving an organoclay emulsifier in an oil to form an oil matrix,
    mixing the oil matrix with the aqueous gel solution to form an encapsulated aqueous gel solution as aqueous phase droplets in the oil matrix, and form an emulsion,
    injecting the emulsion into said porous formation at a temperature at which the emulsion separates in the porous formation,
    crosslinking the polyacrylamide with the polyethyleneimine crosslinker in the porous formation,
    wherein the organoclay consists essentially of at least one ditallow-dimethyl-ammonium salt and at least one phyllosilicate.

2. The method of claim 1, wherein the porous formation has a temperature greater than 85° C.

3. The method of claim 1, wherein the organoclay is present in the emulsion an amount range from 300 to 1,000 ppm and wherein the aqueous phase droplets in the oil matrix have a droplet size ranging from 15 to 20 μm.

4. The method of claim 1, wherein the at least one phyllosilicate is bentonite.

5. The method of claim 1, wherein the oil is diesel oil.

6. The method of claim 1, wherein the aqueous gel solution is formed from sea water or brine.

7. The method of claim 1, wherein the polyacrylamide crosslinked with the polyethyleneimine crosslinker:oil volume ratio is 60-80% polyacrylamide crosslinked with the polyethyleneimine crosslinker and 40-20% oil.

8. The method of claim 1, wherein the organoclay emulsifier is the only emulsifier present in the emulsion.

9. The method of claim 1, wherein the oil comprises a tallowamine acetate salt surfactant.

10. The method of claim 1, wherein the emulsion comprises a tallowamine acetate salt.

* * * * *